United States Patent [19]

Frohn

[11] 4,154,350
[45] May 15, 1979

[54] DEVICE FOR TRANSPORTING HOLLOW PLASTIC BLOW MOLDINGS

[75] Inventor: Walter Frohn, Munich, Fed. Rep. of Germany

[73] Assignee: Bell Maschinenfabrik AG, Kriens, Switzerland

[21] Appl. No.: 841,243

[22] Filed: Oct. 11, 1977

[30] Foreign Application Priority Data

Oct. 15, 1976 [DE] Fed. Rep. of Germany ....... 2646759

[51] Int. Cl.² ............................................. B25J 15/02
[52] U.S. Cl. .................................. 414/416; 294/87 R; 294/95; 414/753
[58] Field of Search ...................... 214/1 BB, 309, 658, 214/DIG. 1, DIG. 3; 294/87 R, 87.22, 87.24, 94, 95, 97

[56] References Cited

U.S. PATENT DOCUMENTS

| 1,822,432 | 9/1931 | Bradley | 294/95 X |
| 2,953,407 | 9/1960 | Cella | 214/309 X |
| 3,412,872 | 11/1968 | Cookson | 294/95 X |
| 3,601,261 | 8/1971 | Michot | 294/95 X |

FOREIGN PATENT DOCUMENTS 734413 8/1955 United Kingdom ..................... 214/309

Primary Examiner—L. J. Paperner
Attorney, Agent, or Firm—Allison C. Collard; Thomas M. Galgano

[57] ABSTRACT

A device is provided for transporting hollow plastic blow moldings having at least one opening thereinto which device is particularly useful for removing hollow moldings from the cavities of blow molds. The device includes at least one gripper unit supported for axial movement toward and away from a blow mold, which unit has gripping means movable between a normal, retracted position and an expanded position. The gripping means are insertable within the opening of a hollow molding disposed in the mold cavity and are expanded to engage and grip the interior walls thereof. The device also includes means for adjusting the degree of expansion of the gripping means to ensure precise position control and to minimize damage to the hollow molding during gripping and transport.

8 Claims, 3 Drawing Figures

DEVICE FOR TRANSPORTING HOLLOW PLASTIC BLOW MOLDINGS

This invention relates to a device for transporting hollow plastic blow-moldings which have at least one opening which is especially useful for removing such moldings from the blow-mold nest, or cavity, of a blow-mold. More particularly, it relates to such a device comprising a separate gripper unit for each molding cavity with expandable gripping means which are adapted to be introduced through the opening into the interior of the hollow molding and expanded therein to engage with the inner wall of the molding.

Blow-molding transport devices of this type are well known. Typically, the gripper units are introduced into the hollow molding while the blow-mold is closed, whereupon the gripping means are expanded to engage with, and hold the molding firmly attached to the gripper unit so that, subsequently, the mold may be opened and the molding transported to another station by displacement of the gripper unit. In these conventional devices, the gripping means are mostly designed for dynamic co-action with the inner wall surfaces of the hollow molding, e.g. in the form of expanding spring clips or other elements which expand in the interior of the molding to a diameter, or cross section larger than the opening in the molding, which enables them to hold the molding attached to the gripper unit. While this form of engagement between gripper device and hollow molding is sufficient to permit the molding to follow the transporting movements of the gripper unit, it can by no means ensure that the hollow molding will in fact be transported to, and subsequently occupy the new position with a sufficient degree of accuracy for the precise application thereto of further processing means associated with such new position, e.g. for deburring, printing, density testing etc.

In other words, if such positional precision is required, a device is needed which allows the hollow molding to be precisely located relative to the gripper unit and subsequently to be released, still preserving the precisely located position, as soon as the new station has been reached to which the molding is required to be transported from the mold or from any other, earlier occupied position. The provision of such a device is the principal objective of the present invention.

Moreover, particularly for hollow blow-moldings which are made to high precision standards, it is desirable that the gripper device should in no way cause damage to the molding. In the case of previously known devices of this kind, the gripping means were designed to apply an uncontrolled engagement pressure to the interior molding walls which could produce notches or indentations in these walls. Accordingly, it is a further aim of this invention to ensure extremely gentle and careful handling of the hollow moldings, inspite of the high degree of precision engagement between the gripper and the molding. More particularly, the invention aims to ensure that the gripper device will engage with the hollow blow-molding with a high degree of precision without, however, applying any more pressure to the interior molding wall than essentially needed for safe and substantially form-fitting, i.e. positive engagement with the gripper.

Furthermore, the parts of the gripper device which extend into the inside of the hollow blow-molding must predictably and reliably assume a safe non-expanded position so that they will not cause any damage when the grippers are withdrawn from the moldings. Lastly, in order to achieve and sustain optimal functional results, the effective application of the gripping means to the hollow molding should be adjustable and controllable at all times.

According to this invention, these and other related objects are attained by virtue of the fact that the position occupied by the gripping means in expanded condition is precisely predetermined by selectively variable adjusting means.

Since the device according to this invention is primarily designed for the manufacture of high-quality hollow moldings, the moldings in question will most probably have a calibrated opening, e.g. in the form of a bottleneck, adhering to strictly defined interior cross-sections, with a precision finished, outwardly-directed rim or edge zone. In an advantageous embodiment of the invention for application to hollow blow-moldings of this type, the gripping means are arranged in such a way that when expanded they will be applied to the inner wall face of the calibrated part of the opening in the molding. Advantageously, the gripper device comprises a stop-face which is directed towards the free end of the gripper, extending normal to the direction of gripper-introduction into the opening of the molding and adapted to co-act with the rim or edge of the opening in such a way that the latter engages therewith when the device has been introduced into the molding.

The advantage of the arrangement according to this invention resides in that the gripper device can be adjusted irrespectively of the necessary distance of expansion displacement thereof in such a way that the gripping means are always applied to the inner wall of the hollow molding with precisely the right, or optimum amount of pressure. The correct end position of the device for effective and optimum gripping engagement with the molding can be easily ascertained by sight, that is to say, by setting the gripper-adjusting means to the appropriate position which is ascertained empirically with the aid of the gripper-traces on a few test pieces of the moldings to be handled in each case.

The frontal, abutting engagement between the end-stop on the gripper unit and the edge, or rim aroung the opening in the hollow molding provides additional stability for the molding which ensures precise movements when the molding is transported by the device from one given position to another, even under considerable acceleration.

In a particularly advantageous embodiment of the invention, the operative movement of the gripper from the normal to the expanded position and vice versa is positively controlled and guided by means of a curve which is associated with the gripper. Most desirably, a separate guide curve of this kind is provided for actuation of each gripper device. According to a further advantageous embodiment, the gripper movements are appropriately adjusted by means of an adjustable end-stop which is associated with he guide curves.

According to another advantageous embodiment of the invention, the gripper unit comprises gripping levers which are mounted pivotally on the gripper in such a way as to permit variations in the radial distance between the operative gripping end of each lever and an axis extending in the direction of operative gripper movement into and out of the opening of the hollow molding. The levers are adapted to co-act with an actuating link which is displaceable relative to the gripper unit and precisely adjustable with regard to its end position, which corresponds to the expanded gripper position, with the aid of precision adjusting or setting means.

According to yet another advantageous embodiment, the actuating link is mounted on the gripper unit for displacement in the direction of the gripper axis. Preferably, the guide curve is provided in a tapering annular space concentric with the gripper axis which accomodates the end portions of the two-armed gripping levers which are on the opposite side to their gripping ends.

In a preferred embodiment, employed in conjunction with multiple molds, provision is made for a common driving member for displacing the gripping means of all of the gripper units provided. Most desirably, the adjusting means are sited in the vicinity of this common driving member.

In further advantageous embodiment, the actuating links have positive-form-fitting engagement with a common cross-beam which is adapted to be displaced in the direction of the gripper axes by an associated drive unit. In a particularly convenient arrangement of this kind, the drive unit is an actuating or servo-cylinder driving one of a pair of parallel guides which are interconnected by the cross beam. The cross beam is longitudinally slidably engaged with the actuating links, and one of the guides is associated with an adjustable endstop to limit guide defelection during the gripper-expansion process.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

In the drawing, wherein similar reference characters denote similar elements throughout the several views.

Referring now in detail to the drawings, the device according to this invention is mounted in a basic frame 10 which is adapted to be connected with suitable means, not shown, for transporting the hollow blow-moldings which are engaged by the device. This basic frame 10 is generally U-shaped and open on its underside, and the lower ends of the lateral frame limbs 10a, 10b are suitably prepared or adapted to receive a supporting beam 12.

Figure 1:
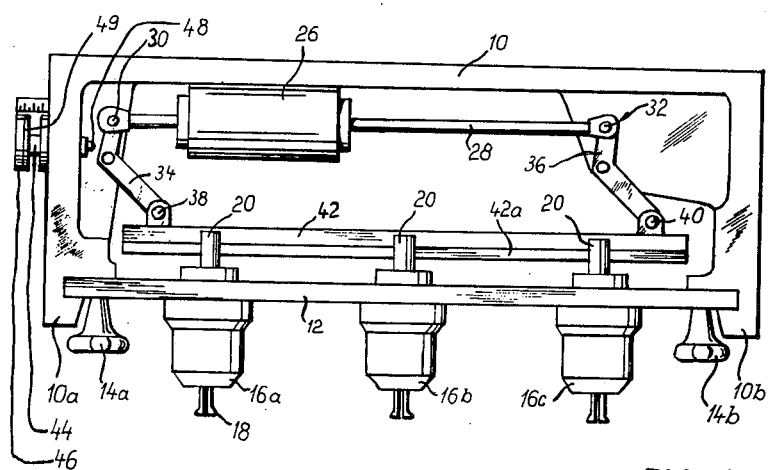
FIG. 1 is a schematic side elevational view of the device according to this invention.

Beam 12 is adapted to be slid into the basic frame 10 in a direction perpendicular to the drawing plane of FIG. 1, i.e., in a horizontal direction and to be secured in position by means of clamping screws 14a, 14b. As a result of this arrangement, griper units of relatively different design can be easily fitten in the device to suit varying shapes of hollow moldings to be handled.

The gripper units, which will be more specifically described below, are generally designated 16a, 16b and 16c. All three of these gripper unites are identical, for which reason only gripping unit 16a will be hereinafter described in detail. In the illustrated example it has been assumed that the device is designed for association with a blow-mold which comprises three mold-nests or cavities, and consequently the device is provided with three gripper units. It has been mentioned that the gripper units may be adapted to the given shape and configuration of the hollow moldings to be handled and for this reason the gripper units which are shown in elevation in FIG. 1 are of slightly different form to those shown in FIGS. 2 and 3. However, in all FIGURES like reference signs have been used for like parts in all gripper units.

By way of actual gripping means, each gripper unit 16a to 16c comprises three levers 18 spaced equi-angularly at intervals of 120° around the vertical longitudinal gripper unit axis. The drawings showing the levers occupying a position wherein they are adjacent, and substantially parallel, to the longitudinal axis. In this position, the levers 18 can be readily introduced into the interior of the hollow molding to be handled, as will be observed from FIG. 2, where the upper region of this molding is outlined in dot-and-dash lines.

Figure 3:
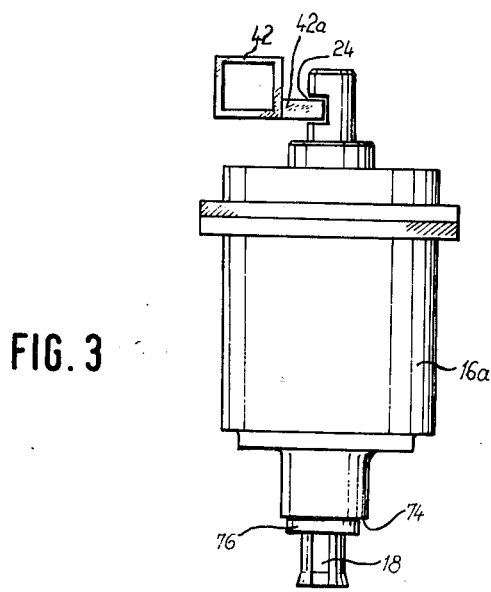
FIG. 3 is a side elevational view taken along the line III—III of FIG. 2.

Levers 18 are actuated by means of vertically displaceable actuating links 20 which are concentric with the gripper unit axis. Each of these actuating links 20 is slidable in a multi-part gripper unit housing 22 which is connected to the supporting beam 12, and the upper lever end which projects out of housing 22 is formed with notch or recess 24 (FIG. 3). In the event of beams 12 being equipped with gripper units of different design these notches 24 are always arranged at the same vertical level so that, when the beam 12 is changed for another, correctly aligned operational engagement with a drive unit mounted on the basic frame 10 is always ensured by notches 24.

The drive unit comprises an actuating- or servo- cylinder 26 wherein a piston (not shown) is reciprocable between two operative positions. The piston is connected with an actuating rod 28 which extends outwardly of the cylinder on both sides thereof. Actuating rod 28 is articulated at each end thereof, at 30 and 32, to one lever arm of bell-crank lever 34, 36. The other lever arm or limb of lever 34, 36, is connected at 38 and 40 respectively to an actuating bar or beam 42 which extends parallel to the rod 28 thereby completing an articulated parallelogram-linkage assembly. On actuation of the cylinder 26 the actuating bar 42 will be driven in a direction substantially parallel to its own extension and consequently it will be displaced in the horizontal as well as in the vertical direction. The actuating bar 42 consists of a box-profile of approximately square cross section with a laterally projecting strip or flange 42a (FIG. 3) which is adapted to engage in notches 24 of actuating links 20. When bar 42 is driven by cylinder 26, the horizontal component of the movement will take the form of sliding in notches 24 and only the vertical component of the actuation movement is transmitted to links 20.

The basic frame 10 further comprises a set screw 44 with a knurled operating grip 46. The opposite end of screw 44 represents an end stop 48 for the bell-crank lever 34 thereby affording a means for precision adjustment with respect to upward displacement of actuating links 20. The knurled operating grip 46 of set screw 44 has a circumferential groove 48 co-acting as a setting mark with a graduated scale arranged in the direction of set-screw adjustment on a scale-mounting 50.

A downwardly tapering cone 52 is provided at the lower end of actuating link 20 in the interior of the gripper unit housing 22. Cone 52 is surrounded by a crown ring 58 arranged in suitably spaced relation therewith to define an annular conical chamber 54 between the outer surface of cone 52 and the inner wall face 56 of crown ring 58. The cone 52 is secured in a rotationally rigid and axially non-slidable manner to link 20 by means of a bolt 60 which extends through a diametral bore through crown ring 58 and through link 20. One end of each lever 18 is formed with a knob or button 62 and extends into this annular chamber 54. The levers are each mounted in the gripper unit housing for pivotal movement about axes 64 which are normal to the direction of operative displacement of links 20 and tangential to an imagined inscribed circle of the pivot axes in one gripper unit. For simplified representation, FIG. 2 only shows one lever 18 which is pivotable in the drawing plane.

As a result of this construction, levers 18 are capable of pivotal movement in radial planes relative to the gripper unit axis. Within, and corresponding to this range of movability of the levers 18, the gripper unit housing 22 is provided with a radial slot 66.

Figure 2:
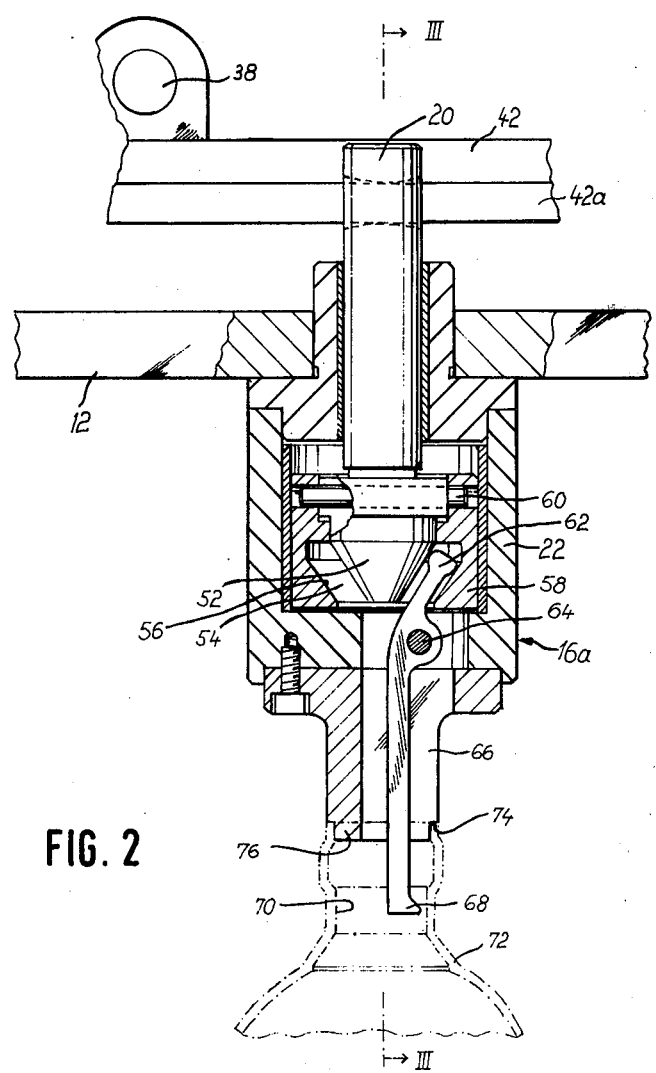
FIG. 2 is a fragmentarily-illustrated sectional view of the device shown in FIG. 1.

The other lever end, which is opposite to the end carrying the knob or button 62, is provided with a gripping beak or cam 68 which can be pivoted radially outwards as shown in FIG. 2, by an upwardly directed movement of the actuating link 20 owing to the fact that in the course of such upward displacement of the link 20 the smaller diameter region of the tapered annular chamber 54 approaches the knob 62. Since the arm of lever 18 which carries the knob 62 is considerably shorter than the other lever arm which carries the gripping beak 68, the lever ratio will be sufficiently high to ensure that even a minor axial displacement of the actuating link 20 can produce a significant outward swing of the beak 68.

The drive mechanism is adjusted with the aid of the set screw 44 in such a way that the gripping beak or cam 68 is applied to the interior wall face 70 of the hollow molding 72 without producing damage or indentations therein. The correct adjustment setting can be easily determined with the aid of a few experimental test pieces. The pressure applied by the beak 68 to the surface 70 need only be sufficiently strong to hold the molding 72 on the gripper unit.

To allow the hollow molding to be transferred with great positional precision from an initial station to an end station, it is necessary- in addition to the appropriately precise displacement of the basic frame 10 which can be readily obtained by the skilled man with the aid of suitable conventional means- that the hollow molding should be securely held on the gripper device during transport. For this reason the gripper unit is provided, preferably at the end thereof which faces the hollow molding 72, with a stop- or abutment face 74, which is adapted to co-act with the rim or edge of the opening in the molding. When the basic frame 10 is lowered towards the molding 72 for introduction of the gripping means into the latter, this stop or locating face 74 engages with the rim 76 around the opening in the molding, thereby preventing the molding from rocking or swinging about the gripper unit. This is particularly important in those cases of practical application where the moldings are transported at high speeds and consequently subjected to considerable accelerations and decelerations. Furthermore, the gripper unit housing 22 may also comprise a spike- or mandrel-like extension 76 which is adapted to engage in the opening of the hollow molding; the latter being made to constant internal dimensional specification by suitable calibration for the successful and advantageous application thereto of the gripper device according to this invention.

While only a few embodiments of the present invention have been shown and described, it will be obvious that many changes and modifications may be made thereunto without departing from the spirit and scope of the invention.

What is claimed is:

1. A device for removing hollow plastic blow moldings which have at least one opening thereinto from the cavities of blow molds, comprising:

a plurality of gripper units each of which is supported for at least axial movement toward and away from a blow mold, said units each including gripping means insertable within the opening of a hollow molding disposed in said blow mold, said gripping means being movable between a normal, retracted position and an expanded position, in the latter position of which said gripper means expands outwardly so that, when said gripping means are inserted into said opening of said molding said gripping means may be moved to said expanded position to thereby engage and grip the interior walls of said molding, said gripping means of each of said gripper units comprising at least one lever pivotably mounted on the associated gripper unit, said lever including an upper lever arm having a free outer end portion and a lower lever arm having a free outer end which serves as a gripping end, said lever being pivotably mounted such that the radial distance between said outer gripping end of said lever and an axis extending in the direction of gripper unit movement toward and away from said blow mold is variable;

a plurality of actuating links each of which coact with one of said levers of said gripping units which are displaceable relative to said gripper units to effect movement of said levers between said normal and expanded positions thereof, said links having a terminal position in which position said levers assume their expanded position, said actuating links being axially displaceably mounted in said gripper units for movement in the direction of the gripper unit axes;

means for positively controlling movement of said gripper means from said normal to said expanded position, said means including a plurality of guide curves each of which is associated with said gripping means of one of said gripping units, said guide curves each including a conical chamber formed in said gripping unit associated therewith and disposed concentrically with said axis thereof, said outer end portion of said upper lever arm of said levers being in sliding engagement with the surface of said chamber;

a common drive means for actuating said actuating links and, in turn, for moving said gripping means; and means for adjusting the degree of expansion of said gripping means which is mounted adjacent to said drive means, said means for adjusting being operable to adjust the terminal position of said levers.

2. The device according to claim 1, wherein each of said hollow moldings has a bottle-neck constriction below and adjacent to said opening thereof and wherein said gripping means are configured such that, upon insertion into said opening of one of said molding and movement thereof to said expanded position, said gripping means will engage the interior surface of said molding in the zone of said bottle-neck constriction.

3. The device according to claim 2 wherein each of said blow moldings has a circular opening having a circumferential edge and wherein each of said gripper units includes an end stop face which abuts and engages the circumferential edge of the blow molding opening when said gripper unit is moved towards the blow mold and said gripping means is inserted into the blow mold opening.

4. The device according to claim 3 wherein each of said gripper units includes a spikelike extension which extends into the opening of the hollow molding and abuts the interior surface thereof when said gripper unit is moved towards the blow mold and said gripping means is inserted into the blow mold opening.

5. The device according to claim 1 wherein each of said guide curves is displaceable and wherein movement of said gripping means between said normal and expanded positions thereof is effected by displacement of the guide curve associated therewith.

6. The device according to claim 5 wherein said means for adjusting the degree of expansion of said gripping means includes an adjustable end stop associated with and limiting movement of each of said guide curves.

7. The device according to claim 1 additionally including a cross-bar coupled to each of said actuating links for effecting synchronous movement thereof, said cross-bar being displaceable in the axial direction of said gripper units by said drive means.

8. The device according to claim 7 wherein said drive means comprises a servo-cylinder and a pair of pivotable parallel spaced-apart guides, interconnected by said cross-bar and at least one of which is driven by said cylinder, wherein said cross-bar is longitudinally slidably engaged with said actuating links and wherein at least one of said guides is disposed for engagement with said adjustable end stop which limits the pivotable movement of said guide to, in turn, limit expansion of said griping means.

* * * * *